US010114135B2

(12) United States Patent
Huang et al.

(10) Patent No.: US 10,114,135 B2
(45) Date of Patent: Oct. 30, 2018

(54) SYSTEM AND METHOD FOR OPTIMIZING SEISMIC DATA ANALYSIS

(71) Applicants: GENERAL ELECTRIC COMPANY, Schenectady, NY (US); EXXONMOBIL UPSTREAM RESEARCH COMPANY, Houston, TX (US)

(72) Inventors: Xiaojie Huang, Schenectady, NY (US); Ali Can, Niskayuna, NY (US); Erhan Bas, Schenectady, NY (US); Weina Ge, San Jose, CA (US); Shubao Liu, Windermere, FL (US); Mark W. Dobin, The Woodlands, TX (US); Mary Johns, Houston, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 317 days.

(21) Appl. No.: 14/985,860

(22) Filed: Dec. 31, 2015

(65) Prior Publication Data
US 2017/0192114 A1    Jul. 6, 2017

(51) Int. Cl.
*G01V 1/28*    (2006.01)
*G01V 1/34*    (2006.01)
*G01V 1/30*    (2006.01)

(52) U.S. Cl.
CPC . *G01V 1/34* (2013.01); *G01V 1/30* (2013.01)

(58) Field of Classification Search
CPC . G01V 1/282; G01V 1/34; G01V 1/28; G01V 1/303; G01V 1/42; G01V 2210/74; G01V 1/345; G01V 99/005; G01V 2210/66
See application file for complete search history.

(56) References Cited

U.S. PATENT DOCUMENTS

| 6,674,689 | B2 | 1/2004 | Dunn et al. |
| 6,735,526 | B1 | 5/2004 | Meldahl et al. |
| 6,754,588 | B2 | 6/2004 | Cross et al. |
| 7,519,476 | B1 | 4/2009 | Tnacheri et al. |
| 8,447,524 | B2 | 5/2013 | Chen et al. |
| 9,638,830 | B2 * | 5/2017 | Meyer ................. G01V 99/005 |
| 9,720,119 | B2 * | 8/2017 | Al-Saleh ............... G01V 1/345 |

(Continued)

OTHER PUBLICATIONS

Hirsch et al., "Graph theory applications to continuity and ranking in geologic models", Computers & Geosciences, vol. 25, Issue 2, pp. 127-139, Mar. 1999.

(Continued)

*Primary Examiner* — Jaehwan Oh
(74) *Attorney, Agent, or Firm* — GE Global Patent Operation; Pabitra Chakrabarti

(57) ABSTRACT

A method includes accessing a seismic image comprising a plurality of features of interest. The method also includes defining a plurality of configuration files for a plurality of graphical models. The method further includes applying the plurality of graphical models to the seismic image. The method also includes generating a plurality of scores for each feature of interest, wherein each graphical model generates a score for each feature of interest. The method further includes combining the plurality of scores for each feature of interest into a plurality of combined scores, wherein each feature of interest has a combined score.

18 Claims, 10 Drawing Sheets

(56) References Cited

U.S. PATENT DOCUMENTS

| | | | |
|---|---|---|---|
| 9,798,027 B2* | 10/2017 | Wrobel | G01V 1/306 |
| 2010/0114495 A1* | 5/2010 | Al-Saleh | G01V 1/364 |
| | | | 702/17 |
| 2010/0174489 A1* | 7/2010 | Bryant | E21B 43/00 |
| | | | 702/6 |
| 2011/0181610 A1* | 7/2011 | Baggs | G06T 11/001 |
| | | | 345/589 |
| 2013/0179080 A1 | 7/2013 | Skalinski et al. | |
| 2013/0223187 A1* | 8/2013 | Thapar | G01V 1/345 |
| | | | 367/73 |
| 2014/0118345 A1 | 5/2014 | Hager et al. | |
| 2014/0156246 A1* | 6/2014 | Cheskis | G01V 1/302 |
| | | | 703/10 |
| 2014/0188769 A1* | 7/2014 | Lim | G06N 99/005 |
| | | | 706/12 |
| 2014/0225890 A1* | 8/2014 | Ronot | G01V 1/282 |
| | | | 345/420 |
| 2014/0278115 A1* | 9/2014 | Bas | G01V 1/30 |
| | | | 702/14 |
| 2014/0278117 A1* | 9/2014 | Dobin | G01V 1/345 |
| | | | 702/16 |
| 2014/0303896 A1* | 10/2014 | Wrobel | G01V 1/307 |
| | | | 702/14 |
| 2015/0254567 A1* | 9/2015 | Imhof | G01V 1/301 |
| | | | 703/10 |
| 2016/0161635 A1* | 6/2016 | Ramsay | G01V 99/005 |
| | | | 703/9 |
| 2017/0193647 A1* | 7/2017 | Huang | G06T 7/0004 |
| 2017/0219729 A1* | 8/2017 | Yan | G01V 1/303 |

OTHER PUBLICATIONS

Groot et al., "Selecting and Combining Attributes to Enhance Detection of Seismic Objects", EAGE 63rd Conference & Technical Exhibition, pp. 1-5, Jun. 11-15, 2001.

Bond et al., "What do you think this is? 'Conceptual uncertainty' in geoscience interpretation", GSA Today: v. 17, No. 11, pp. 4-11, Nov. 2007.

* cited by examiner

```
Attribute = CLOSURE is threshold_closure_0_1
Attribute = AMPLITUDE is threshold_amp_0_1
Attribute = SKELETON_TERMINATIONS is threshold_terminations_0_1
Attribute = GRAD_TERMINATIONS is ait_terminations_threshold_grad2d Attribute = CLOSURE_BOUNDARY is threshold_closure_0_1_boundary
Attribute = CLOSURE_BOUNDARY_ORIENTATION is threshold_closure_0_1_boundary_orientation
Attribute = SKELETON_TERMINATIONS_BOUNDARY is threshold_terminations_0_1_boundary
Attribute = SKELETON_TERMINATIONS_BOUNDARY_ORIENTATION is threshold_terminations_0_1_boundary_orientation
Attribute = GRAD_TERMINATIONS_BOUNDARY is Pembina_Nisku_ait_terminations_threshold_thick_grad2d_boundary
Attribute = GRAD_TERMINATIONS_BOUNDARY_ORIENTATION is ait_terminations_threshold_thick_grad2d_boundary_orientation Node = L1 has CLOSURE AMPLITUDE CLOSURE_BOUNDARY CLOSURE_BOUNDARY_ORIENTATION
Node = L2 has SKELETON_TERMINATIONS SKELETON_TERMINATIONS_BOUNDARY SKELETON_TERMINATIONS_BOUNDARY_ORIENTATION
Node = L3 has GRAD_TERMINATIONS GRAD_TERMINATIONS_BOUNDARY GRAD_TERMINATIONS_BOUNDARY_ORIENTATION U = L1 has HIGH_CLOSURE 0.5
U = L1 has HIGH_CLOSURE_BOUNDARY 0.5
U = L1 has HIGH_AMPLITUDE 0.5

U = L2 has HIGH_SKELETON_TERMINATIONS 0.5
U = L2 has HIGH_SKELETON_TERMINATIONS_BOUNDARY 0.5

U = L3 has HIGH_SKELETON_TERMINATIONS 0.5
U = L3 has HIGH_SKELETON_TERMINATIONS_BOUNDARY 0.5

P = L2 SURROUND L1 -20 200 400 100
P = L3 CONFORMING_SURROUND L1 -20 20 0 600 100

POST = cm_post orig_amplitude.segy orig_amlitude_median_filter.segy threshold_closure.segy
```

FIG. 2

| TERMINATIONS | GRADIENT TERMINATION | GRADIENT TERMINATION | SKELETON TERMINATION | SKELETON TERMINATION |
|---|---|---|---|---|
| SCORING METHODS | CUSTOM SCORING | STANDARD SCORING | CUSTOM SCORING | STANDARD SCORING |
| | GROUP 1 | GROUP 2 | GROUP 3 | GROUP 4 |

FIG. 6

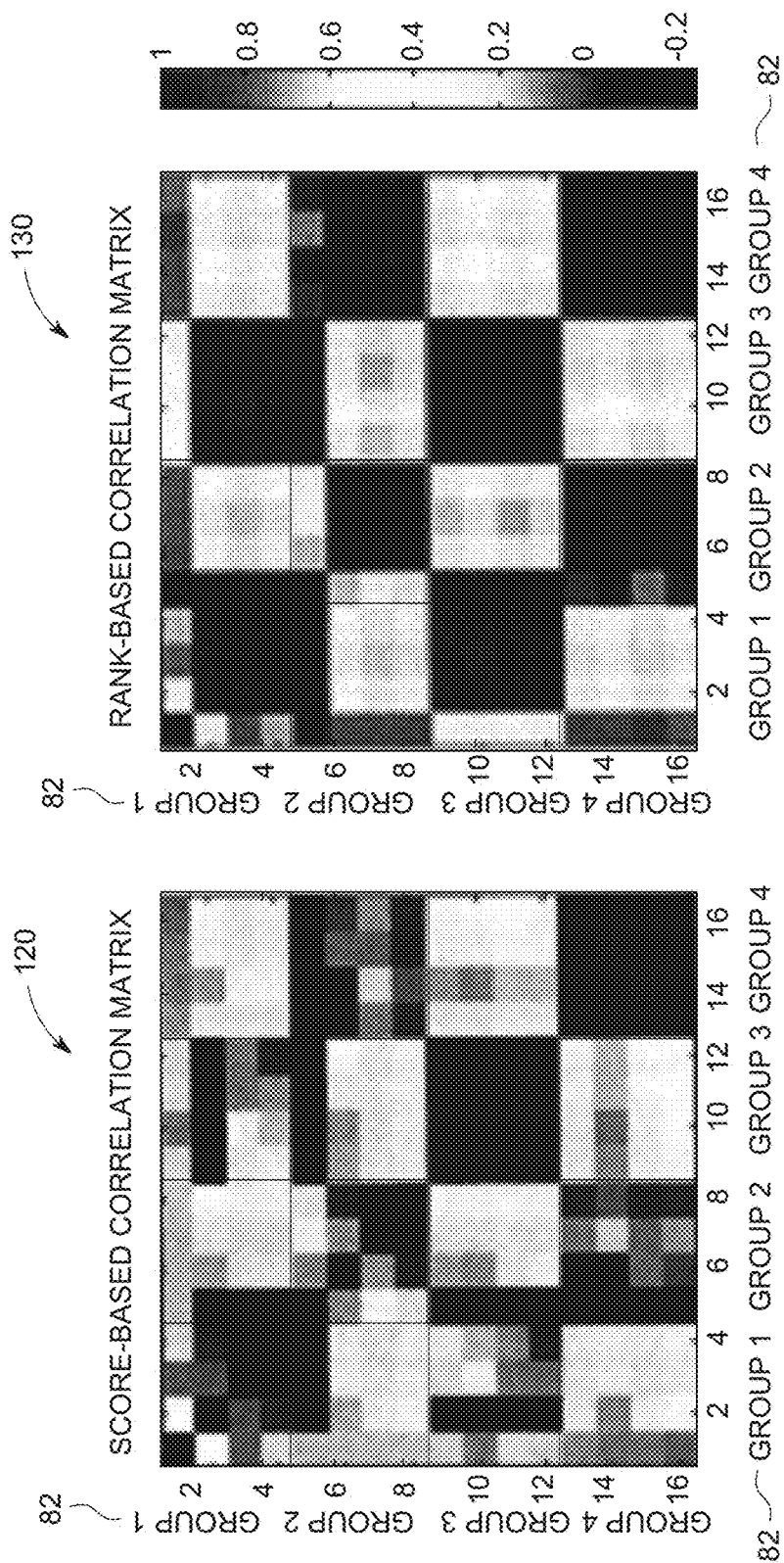

SYSTEM AND METHOD FOR OPTIMIZING SEISMIC DATA ANALYSIS

BACKGROUND

The subject matter disclosed herein relates to the analysis of seismic data, such as to automatically identify features of interest.

Seismic data is collected and used for evaluating underground structures and features that might otherwise not be discernible. Such seismic data may be useful in searching for minerals or materials (such as hydrocarbons, metals, water, and so forth) that are located underground and which may be difficult to localize. In practice, the seismic data is derived based on the propagation of seismic waves through the various strata forming earth. In particular, the propagation of seismic waves may be useful in localizing the various edges and boundaries associated with different strata within the earth and with the surfaces of various formations or structures that may be present underground.

The seismic waves used to generate seismic data may be created using any number of mechanisms, including explosives, air guns, or other mechanisms capable of creating vibrations or seismic waves capable of spreading through the Earth's subsurface. The seismic waves may reflect, to various degrees, at the boundaries or transitions between strata or structures, and these reflected seismic waves are detected and used to form a set of seismic that may be used to examine the subsurface area being investigated.

One challenge that arises in the context of these seismic investigations is in the interpretation and analysis of the large three-dimensional data sets that can be generated in a seismic survey project. In particular, analysis of such data sets may be tedious and time-consuming, potentially requiring months of manual work to analyze. Further, the complexity of the seismic data may limit the usefulness or effectiveness of automated approaches for data analysis.

BRIEF DESCRIPTION

In a first embodiment, a method includes accessing a seismic image comprising a plurality of features of interest. The method also includes defining a plurality of configuration files for a plurality of graphical models. The method further includes applying the plurality of graphical models to the seismic image. The method also includes generating a plurality of scores for each feature of interest, wherein each graphical model generates a score for each feature of interest. The method further includes combining the plurality of scores for each feature of interest into a plurality of combined scores, wherein each feature of interest has a combined score.

In a second embodiment, a system includes a processor, configured to access a seismic image comprising a plurality of features of interest. The processor is also configured to define a plurality of configuration files for a plurality of graphical models. The processor is further configured to apply the plurality of graphical models to the seismic image. The processor is also configured to generate a plurality of scores for the plurality of features of interest. The processor is further configured to combine the plurality of scores into a plurality of combined scores for the plurality of features of interest.

In a third embodiment, a method includes accessing a seismic image comprising a plurality of features of interest. The method also includes defining a plurality of configuration files for a plurality of graphical models. The method further includes applying the plurality of graphical models to the seismic image. Applying the plurality of graphical models to the seismic image includes generating a plurality of scores for each feature of interest. Applying the plurality of graphical models to the seismic image also includes generating a plurality of rankings of the plurality of features of interest for each graphical model based on the plurality of scores. Applying the plurality of graphical models to the seismic image further includes combining the plurality of rankings into a respective combined ranking for each feature of interest.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is an example configuration file used to define the graphical model to detect the carbonate mound in accordance with aspects of the present disclosure;

FIG. 6 is a table that summarizes a grouping of a set of graphical models, in accordance with aspects of the present disclosure;

FIG. 7 is a score-based correlation matrix for a groups of graphical models, in accordance with aspects of the present disclosure;

FIG. 8 is a rank-based correlation matrix for a groups of graphical models, in accordance with aspects of the present disclosure;

DETAILED DESCRIPTION

Figure 1:
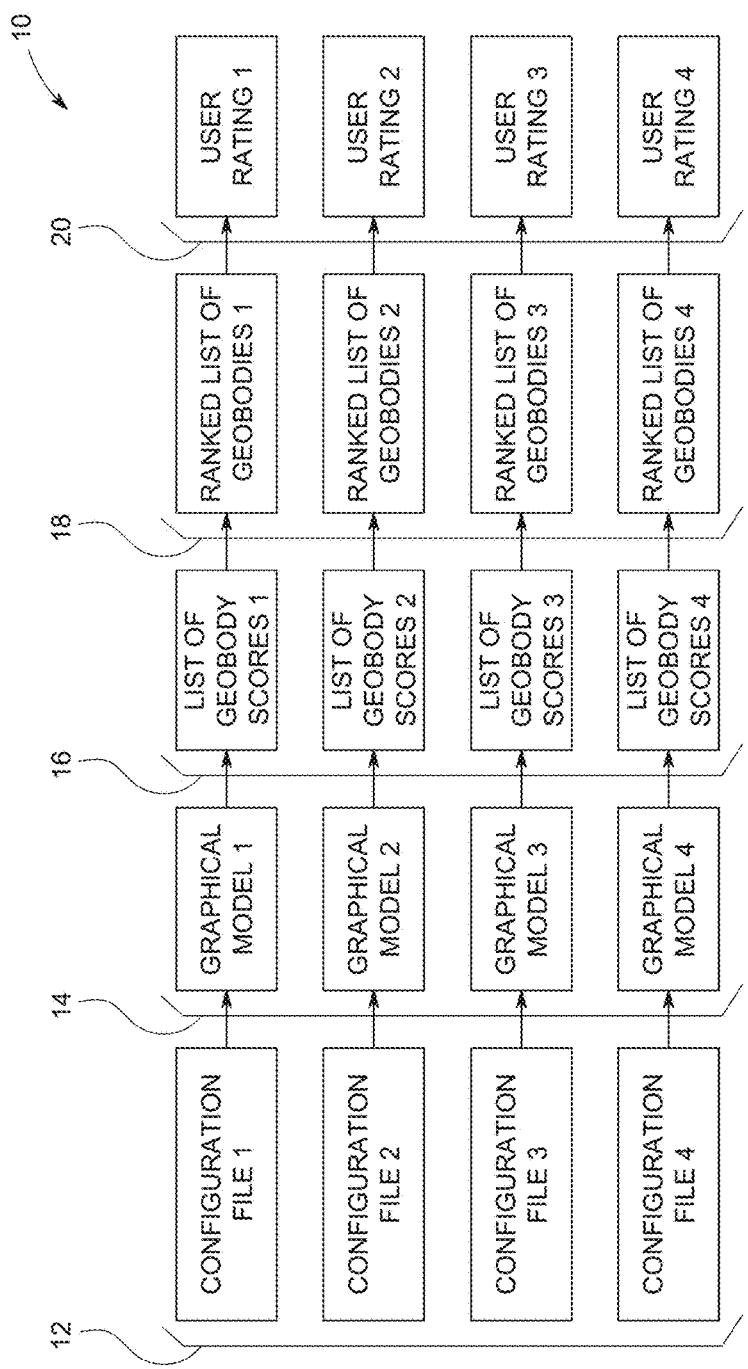
FIG. 1 illustrates a workflow for a graphical-model-based geobody detection system to apply a plurality of graphical models in accordance with aspects of the present disclosure.

Seismic data may be analyzed and used to detect subsurface features of interest, such as geological structures or formations that may be indicative of hydrocarbon resources. For example, detecting geobodies (e.g., channels, pinchouts, progrades, gas chimneys, and so forth) from a three-dimensional (3D) seismic image or survey may be performed as part of prospecting for hydrocarbons (e.g., oil, natural gas, and so forth). As generally used herein, a geobody is a geophysical feature of interest contained in the seismic data or some derived (attribute) data set. Such a geobody may take the form, in a volumetric data set, of a set of contiguous, connected, or proximate voxels within the image data that may in turn, based on the characteristics of the identified voxels, correspond to an actual physical or geological feature or structure within the data, such as a geological structure, formation, or feature. Although the present discussion is generally described in the context of seismic data, it should be appreciated that the present approaches and discussion may be generally applicable in the context of geophysical data (attributes, velocities, or impedances or resistivity volumes), geologic data (geologic models, or geologic simulations), wireline data, or reservoir simulation data or any combinations thereof.

One of the challenges in hydrocarbon prospecting is the time-consuming and imprecise task of interpreting the 3D volumes generated from the acquired seismic image or data. For example, a single seismic volume may require months of manual work to analyze. As discussed herein, automated methods may make such time-consuming work more feasible for a reviewer to interpret. However, automated interpretation of a 3D volume generated from seismic images may be difficult to achieve in practice. For example, it may be useful for an automated analysis of seismic data to classify and, in certain instances, rank or otherwise sort various geobodies (e.g., channels, pinchouts, progrades, gas chimneys, and so forth) identified in a seismic volume according to type and/or the degree of interest or preference for certain types of features. As will be appreciated, certain types of geological features (or features having certain characteristics) may be of more interest than other types. It would, therefore, be useful if the geological features that are of the greatest interest to the reviewer are ranked or sorted so as to make the review of these features more efficient or productive.

By way of brief introduction, it should be appreciated that such automated approaches to analyzing seismic data may involve algorithms used to identify geobodies within a seismic volume or image, to classify these features into different types or by different characteristics, and, in some instances, to separately rank a set of classified features to further facilitate user review. For example, computer-aided inference systems that aim to imitate the decision-making of a human expert have proven to be effective in identifying geobodies in seismic images. Graphical-model-based geobody detection systems may be used to capture geophysical properties of a geobody. A graphical model characterizes the geophysical properties using a plurality of geophysical attributes and relationships between these attributes (e.g., rules). A variety of geophysical context information may be represented by different combinations of attributes and rules.

A user may define the graphical model by modifying a configuration file. The inference system then screens the seismic image to generate a list of geobodies whose geophysical context information agree with the graphical model. Each listed geobody is scored based on agreement with the graphical model and the list of geobodies is ranked based upon their scores. A user reviews the ranked list for geobodies exhibiting desirable characteristics.

When the graphical-model-based geobody detection system is applied to the seismic image, the user is typically not able to determine the optimal graphical model configuration (i.e., attributes, rules, and parameters) that exactly captures the desired geobody because the graphical model used may be configured for specific circumstances. For example, parameters set for one set of application (e.g., direct hydrocarbon indicators) would not translate to another application (e.g., carbonate mounds) because the underlying geological and geophysical phenomena are different. Even for the same geological application, the graphical model may be setup differently based on location. For example, the graphical model may be configured for a site in Gulf of Mexico as opposed to a site in West Africa because of the unique geological and geophysical characteristics of each site. In addition to geological dependency, variations in the quality of the data, the stratigraphy of the data, and the type of attributes computed and the associated parameters may result in preferring one or more graphical models over another.

Accordingly, it may be desirable for the user to apply a plurality of graphical models to the seismic image. Each graphical model may be tested one at a time and produce a score for each identified geobody and a ranked list of the scored geobodies. To review the identified geobodies and the results of the graphical-model-based geobody detection system, the user may evaluate each ranked list of the plurality of graphical models, which may be tedious and inefficient. The present approaches address the inefficiencies in this evaluation process.

FIG. 1 illustrates a workflow 10 for a graphical-model-based geobody detection system to apply the plurality of graphical models 14. The user may define the plurality of graphical models 14 by modifying the corresponding plurality of configuration files 12 that capture the geophysical properties of the desired geobody. Specifically, the user may modify geophysical attributes and rules that are defined in the plurality of configuration files 12. The graphical-model-based geobody detection system identifies geobodies by segmentation algorithms. For example, for carbonate mounds, each geobody identified is segmented as connected components that satisfy the geophysical properties provided by each configuration file 12, such as termination, closure, amplitude polarity, and amplitude magnitude. A computer-aided inference system then uses each configuration file 12 to apply each corresponding graphical model 14 to the seismic image. For each geobody identified, each graphical model 14 may compute a score based on agreement of the geophysical characteristics of the geobody with the graphical model 14. The plurality of graphical models 14 may generate a corresponding plurality of lists of geobody scores 16. Based on the plurality of lists 16 of geobody scores, the plurality of graphical models 14 may also generate a corresponding plurality of ranked lists 18 of geobodies. Finally, the user may enter a rating 20 for the performance of each graphical model 14.

FIG. 2 is an example configuration file 12 used to define the graphical model 14 to detect the carbonate mound. The configuration file 12 defines attributes including two terminations 54, 56, a closure 50, and an amplitude polarity 52. The configuration file 12 also defines two pairwise rules including a surround rule 58 and a conforming-surround rule 60.

Figure 3:
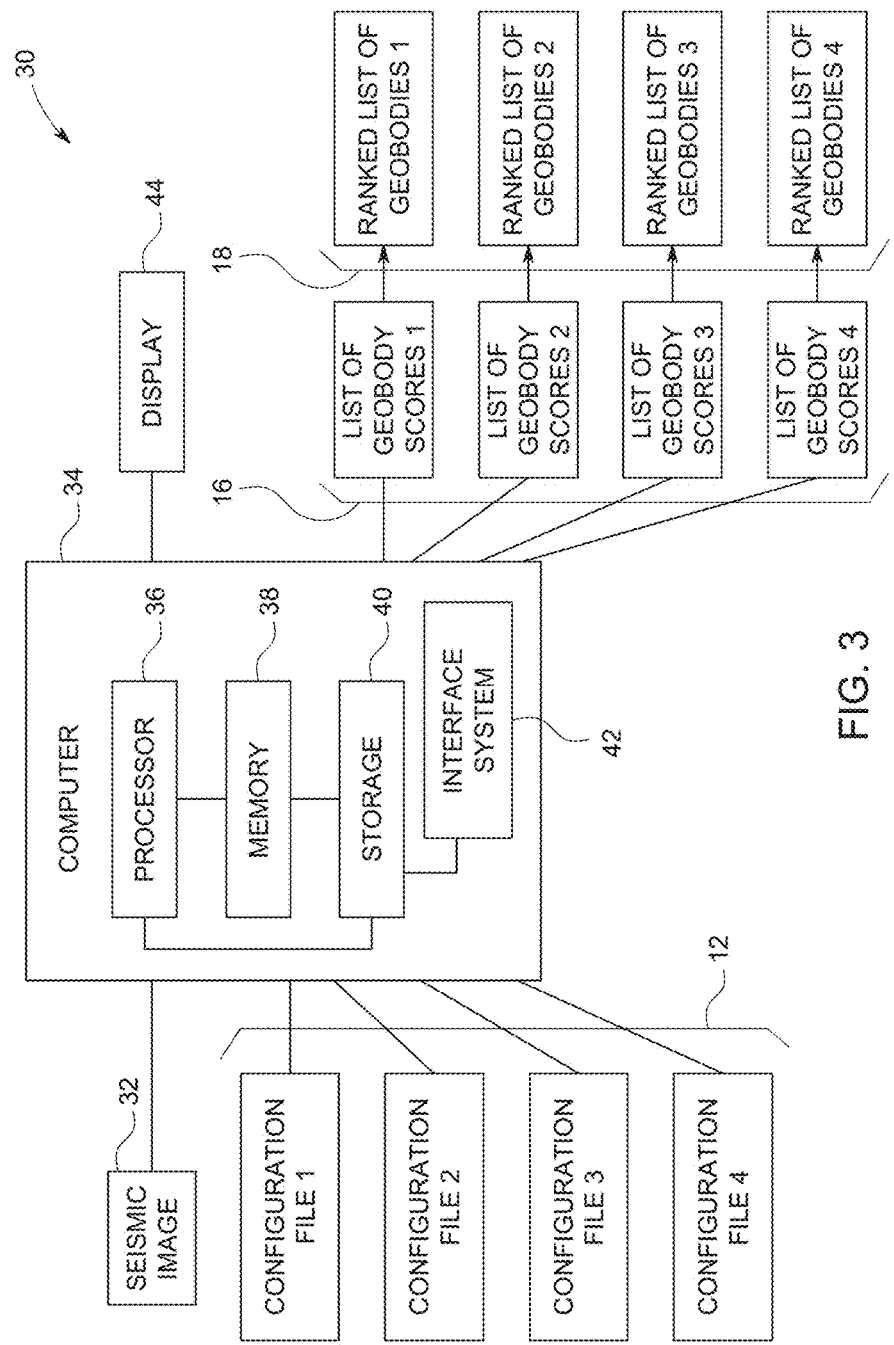
FIG. 3 illustrates a diagram of a processor-based system configured to execute a graphical-model-based geobody detection system in accordance with aspects of the present disclosure.

FIG. 3 illustrates a diagram of a processor-based system 30 configured to execute the graphical-model-based geobody detection system in accordance with the present disclosure. A computer 34 that is a processor-based system having a non-volatile storage 40 (such as a magnetic or solid state hard drive or an optical media) may store data, including the inference system 42, the seismic image 32, and/or the plurality of configuration files 12, as well as one or more processor-executable routines or algorithms suitable for processing the data in accordance with the present approaches. In addition, the computer 34 may include a volatile memory component 38 suitable for storing data as well as processor-executable routines or algorithms prior to handling by the processor 36. The processor 36 may generate new data (such as the plurality of lists 16 of geobody scores or the plurality of ranked lists 18 of geobodies) upon executing the stored algorithms in accordance with the present approaches. The data generated by the processor 36 may be stored in the memory 38 or the storage device 40 may be displayed for review, such as on an attached display 44.

Figure 4:
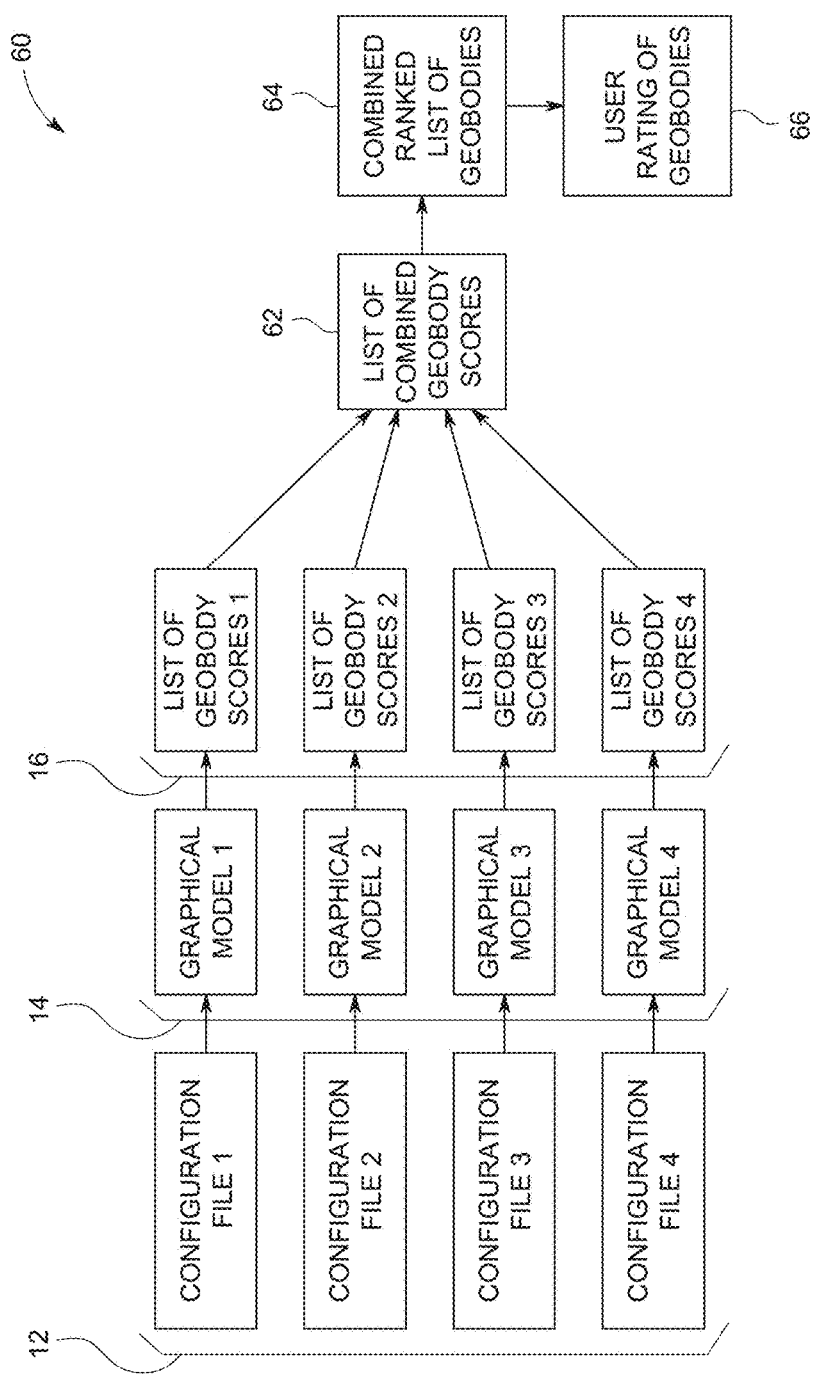
FIG. 4 illustrates a workflow for an embodiment of a graphical-model-based geobody detection system in accordance with aspects of the present disclosure.

To improve the efficiency of the workflow 10, it may be desirable to combine the plurality of ranked lists 18 of geobodies into a single ranked list. FIG. 4 illustrates a workflow 60 for the embodiment of the graphical-model-based geobody detection system to apply the plurality of graphical models 14 in accordance with this disclosure. The inference system 42 may then apply the plurality of graphical models 14 to the seismic image 32 as illustrated in FIG. 1, wherein the plurality of graphical models 14 generate the corresponding plurality of lists 16 of geobody scores. For each geobody identified, each graphical model i may compute a score $s_i$. Based on the score $s_i$, the list of geobodies may be ranked based upon a degree of agreement with the graphical model i. For example, the geobodies identified by graphical model i may be ranked by sorting the scores $s_i$ in descending order, wherein each geobody has a rank $r_i$. It is recognized that the scores $s_i$ generated by each graphical model i may have represent different meanings and different ranges, making them difficult to compare directly. It may thus be desirable to use a different, but related, metric to compare the graphical models. In some embodiments, the scores $s_i$ are normalized. For example, each score $s_i$ may be divided by a constant $c_i$, the mean of the ten highest scores $s_i$, to get the normalized score $t_i$. In some embodiments, only a portion of the plurality of scores $s_i$ is normalized to avoid noise introduced by low-value scores $s_i$.

The plurality of lists 16 of geobody scores may be combined into a single list 62 of combined geobody scores. Specifically, the plurality of scores $s_i$ generated from the plurality of graphical models i for each geobody may be combined into a single score $s_c$ for the geobody. Additionally, the combined scores $s_c$ for the geobodies may be sorted to generate a combined ranked list 64 of geobodies.

A variety of algorithms may be used to combine the plurality of scores $s_i$ for each geobody into the single score $s_c$. By way of non-limiting examples, three algorithms that use different weight distribution among the plurality of graphical models scores $s_i$ are illustrated below. As discussed above, the algorithms may be performed using the original scores $s_i$, the normalized scores $t_i$, or the ranks $r_i$.

Combination Algorithm 1: Average Combining.

One way of combining the scores $s_i$ is to take the average of the plurality of scores as the combined score, meaning equal weights are assigned to each score:

$$s_c = \Sigma_i s_i \quad (1)$$

Combination Algorithm 2: Maximum Combining.

An alternative way of combining the scores $s_i$ is to select the best (e.g., maximum) score a geobody received as its combined score (as shown in equation (2)). This means that one graphical model among the plurality of graphical models dominates the combined ranking for each geobody.

$$s_c = \max_i s_i \quad (2)$$

Combination Algorithm 3: Correlation-Based Combining.

When the plurality of the scores $s_i$ are generally equally discriminative but the correlations among them are not evenly distributed, the scores $s_i$ that are more correlated with each other would be overemphasized if an average ranking scheme is used. To alleviate this problem, a correlation-based combining algorithm may be employed:

$$s_c = \Sigma_i w_i s_i \quad (3)$$

where $$w_i = \frac{1}{\Sigma_j corr(i,j)}, \quad (4)$$

and corr(i, j) stands for the Pearson correlation coefficient between graphical models i and j. When the rank is used as score, corr(i, j) becomes Spearman's rank correlation coefficient. The correlation coefficient corr(i, j) is given by:

$$corr(i,j) = \frac{mean([s_{i,k} - mean(s_{i,k})][s_{j,k} - mean(s_{j,k})])}{std(s_{i,k})std(s_{j,k})} \quad (5)$$

Additionally, the absolute scores $s_i$ may be noisy, while the rank $r_i$ may be more noise-tolerant. In some embodiments, then, the ranks $r_i$ may be used instead of the original scores $s_i$. The user may evaluate the performance of the graphical models i by evaluating each ranked geobody in the combined ranked list 64 of geobodies and providing a rating 66.

Figure 5:
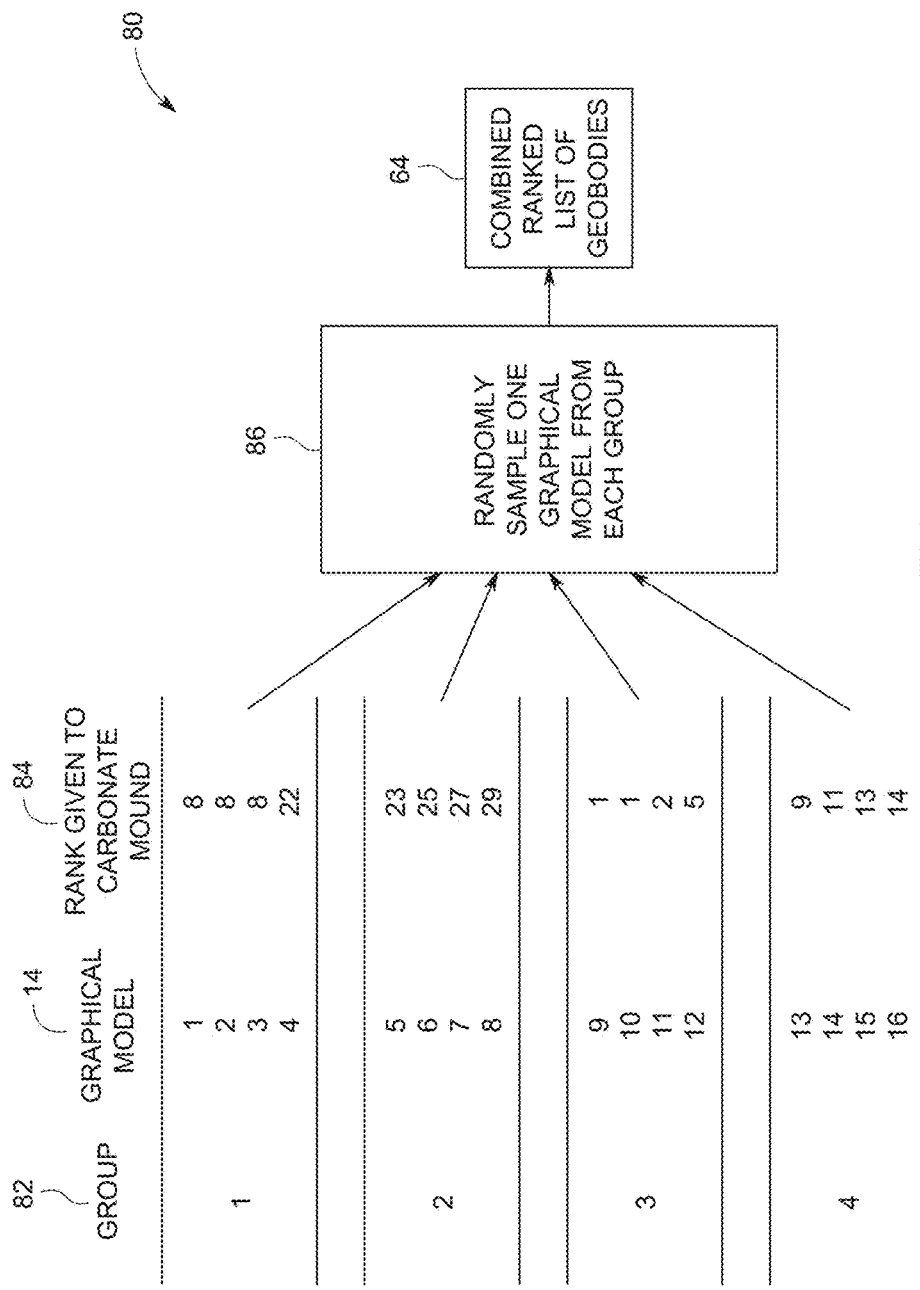
FIG. 5 is a diagram of the embodiment of a graphical-model-based system applying a set of sixteen graphical models to a seismic image that includes, inter alia, a specific geobody (e.g., a carbonate mound), in accordance with aspects of the present disclosure.

As an example of the effectiveness of the systems and methods disclosed herein, FIG. 5 is a diagram 80 of the embodiment of the graphical-model-based system applying a set of sixteen graphical models 14 to the seismic image 32 that includes, inter alia, a specific geobody (e.g., the carbonate mound). The set of graphical models 14 is divided into four groups 82, such that each group 82 comprise four graphical models 14 that share similar combinations of geophysical attributes and rules (e.g., geophysical terminations 102 and scoring methods 104) as summarized in the table 100 illustrated in FIG. 6. Specifically, Group 1 uses gradient termination and custom scoring, Group 2 uses gradient termination and standard scoring, Group 3 uses skeleton termination and custom scoring, and Group 4 uses skeleton termination and standard scoring. Standard scoring may include any method of standard aggregation-based scoring. Custom scoring may be any method of scoring other than standard aggregation-based scoring. As discussed above, each graphical model 14 characterizes and ranks the geobodies in the seismic image 32 using the geophysical attributes and rules defined in its respective configuration file 12. For example, as shown in FIG. 5, graphical models 1-4 (in Group 1) rank the carbonate mound $8^{th}$, $8^{th}$, 8th, and $22^{nd}$, respectively.

One graphical model is randomly selected 86 from each graphical model group 82 to obtain a subset of four graphical models 14. For each score type discussed above (i.e., original score $s_i$, normalized score $t_i$, and rank $r_i$) and each combining algorithm (i.e., average combining, maximum combining, and correlation-based combining), the combined ranked lists 64 of geobodies are generated. When sampling one graphical model 14 from each group 82, major correlations among the sampled four graphical models 14 were eliminated, especially in the case of using the rank as the score. Then another random subset of four graphical models 14 are selected and the process is repeated (for a total of 200 times).

When combining the plurality of scores $s_i$ for each geobody into the single score $s_c$, it is more likely that the scores $s_i$ between the four groups are more correlated than others. In this case, correlation-based combining may compensate for these correlations. Accordingly, when using the scores to perform the combined ranking of geobodies, correlation-based combining performs substantially better than average combining. However, when using the plurality of ranks $r_i$, correlation-based combining performs only slightly better than average combining. For example, FIG. 7 is a score-based correlation matrix 120 for the groups 82 of graphical models 14. FIG. 8 is a rank-based correlation matrix 130 for the same groups 82. As expected, the graphical models 14 are highly correlated within each of the four groups 82. However, the graphical models 14 are less correlated between the groups 82. This distinction between intra-group correlation and inter-group correlation is more clearly represented in the rank-based correlation matrix 130 than in the score-based correlation matrix 120.

By combining the analyses of the plurality of different graphical models 14, the single combined ranked list 64 of geobodies may provide a superior result than the ranked list 18 of geobodies generated by any one graphical model 14 among the plurality of graphical models 14. Additionally, the user may evaluate the single combined ranked list 64 of geobodies to derive the desirability and accuracy of each graphical model 14 rather than evaluating each graphical model's 14 ranked list 18 of geobodies. The overall efficiency of the graphical-model-based geobody detection system may be greatly improved by allowing the user to evaluate the single combined ranked list 64 of geobodies instead of the plurality of ranked lists 18 of geobodies. Precisely setting up internal parameters of graphical models 14 may also be eliminated.

Figure 9:
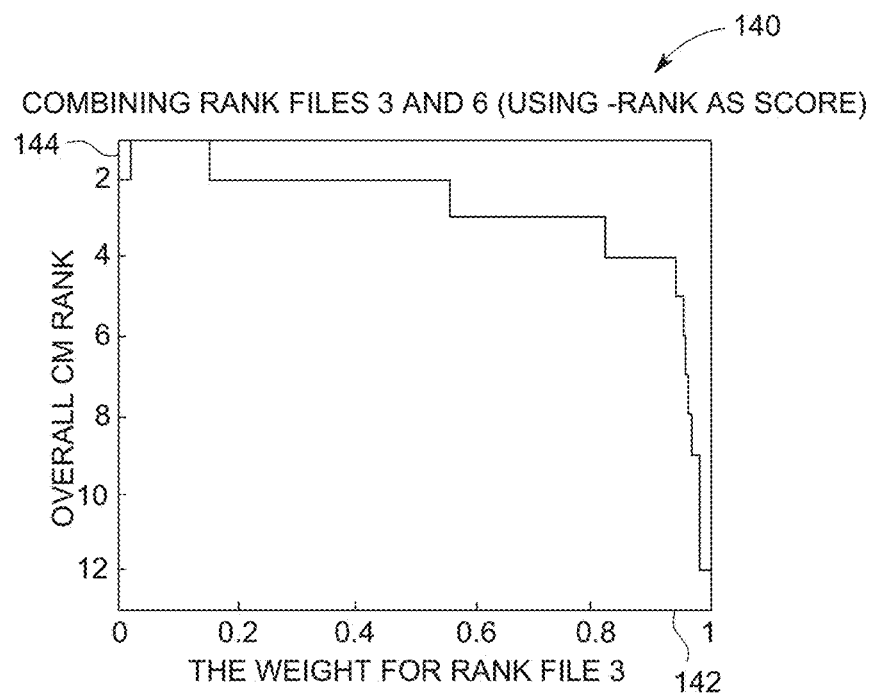
FIG. 9 is a plot illustrating the performance and bound of linearly combining two graphical models using the rank as the score, in accordance with aspects of the present disclosure.
Figure 10:
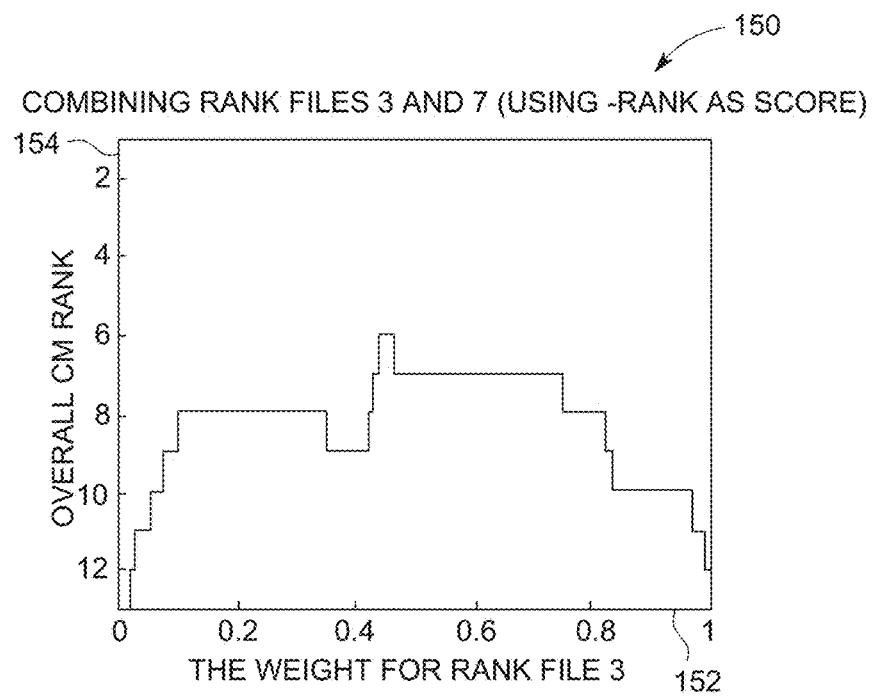
FIG. 10 is a another plot illustrating the performance and bound of linearly combining two graphical models using the rank as the score, in accordance with aspects of the present disclosure.

FIGS. 9 and 10 illustrate superior performance of the graphical-model-based system using a combination of graphical models over using a single graphical model. Specifically, FIG. 9 is a plot 140 illustrating the performance and bound of linearly combining graphical models 3 and 6 using the rank as the score. The ranks for the carbonite mound generated by graphical models 3 and 6 were combined using a linear weighted combination. The x-axis 142 of the plot 140 represents the weight for the rank of graphical model 3 (where at weight=0, the rank of graphical model 3 is not used and only the rank of graphical model 6 is used). The y-axis 144 of the plot 140 represents the combined rank for the carbonite mound generated by the linear weighted combination of graphical models 3 and 6. As illustrated, combining the ranks for the carbonite mound generated by graphical models 3 and 6 results in a better rank for a wide range of weight compared to using only the rank generated by graphical model 3 or 6. Similarly, FIG. 10 is a plot 150 illustrating the performance and bound of linearly combining the ranks for the carbonite mound generated by graphical models 3 and 7 using the rank as the score. As in plot 140, combining the ranks for the carbonite mound generated by graphical models 3 and 7 results in a better rank for a wide range of weight compared to using only the rank generated by graphical model 3 or 7. Both plots 140, 150 indicate the benefit of combined ranking.

Figure 11:
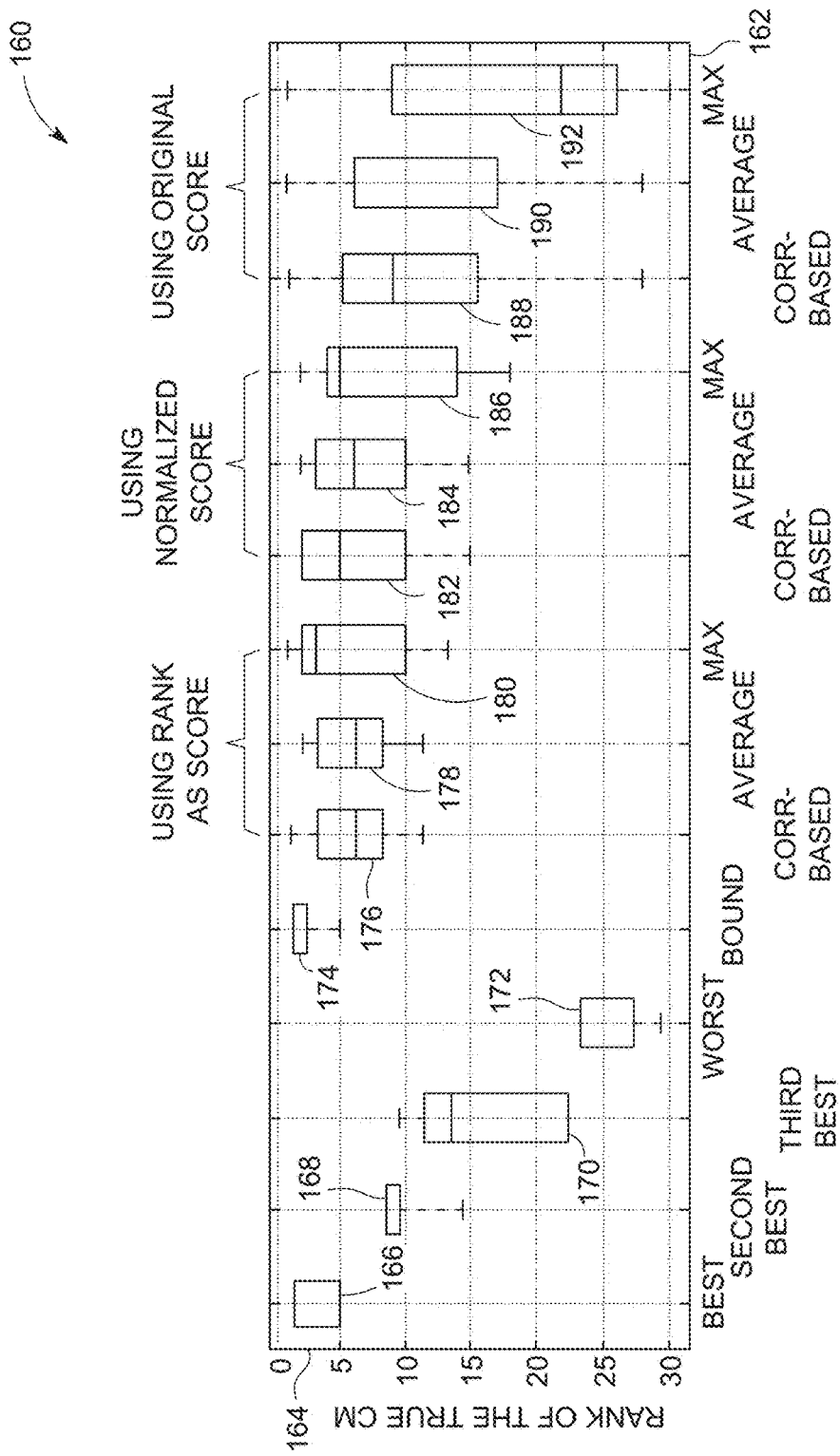
FIG. 11 is a boxplot that illustrates the variations of the combined ranked list of geobodies generated by the embodiment of a graphical-model-based geobody detection system compared to single-model ranked lists of geobodies, in accordance with aspects of the present disclosure.

FIG. 11 is a boxplot 160 that illustrates the variations of the combined ranked list 64 of geobodies generated by the embodiment of graphical-model-based geobody detection system compared to single-model ranked lists 18 of geobodies. The x-axis 162 indexes the different ranked lists of geobodies. The y-axis 164 is the rank of the carbonate mound in the presented ranked lists of geobodies. As illustrated, the single-model ranked lists 166, 168, 170, 172 of geobodies vary across the four groups of graphical models 14. The best ranking results 166 are in the range of $1^{st}$ to $5^{th}$, while the worst ranking results 172 are in the range of $20^{th}$ to $30^{th}$. Without prior knowledge of these results, determining the best performing graphical model 14 at detecting the carbonate mound may be a difficult process.

The theoretical bound 174 illustrates that if the graphical models 14 are linearly weighted properly and combined, the results will be superior to the best single-model 166. The boxplot 160 shows that using the rank as the score 176, 178, 180 or the normalized score 182, 184, 186 as the score is more reliable than using the original score 188, 190, 192 as the score. The three combining methods provide comparable results. The maximum combining algorithm 180, 186, 192 tends to produce higher variance. When the rank or the normalized score are used as the score, the correlation-based combining algorithm and the average combining algorithm produce fairly similar results. As discussed above, when sampling one graphical model 14 from each group 82, major correlations among the sampled four graphical models 14 were eliminated, especially in the case of using the rank as the score. When the score is used, it is more likely that the four sampled graphical models 14 between the groups 82 are more correlated than others. In this case, correlation-based combining compensates for these correlations. Accordingly, when using the original score, correlation-based combining performs substantially better than average ranking, while when using the rank as the score, correlation-based combining performs only slightly better than average ranking. Comparing the performance of using the combined ranked lists 64 of geobodies to the ranked list 18 of geobodies generated by the single graphical models 14 shows that, without prior knowledge of the best performing single graphical model 14 to use, achieving ranking results close to the performance of the best single graphical model 14 is possible by combining the results of the plurality of graphical models 14.

As mentioned above, in some embodiments, the user may evaluate the performance of the plurality of graphical models i by evaluating each ranked geobody in the combined ranked list 64 of geobodies and providing a rating 66. For example, supposing $R_i=[-r_1, -r_2, \ldots, -r_N]$ is the combined ranked list 64 of geobodies generated by graphical models i for N geobodies. The user may review and rate the geobodies by populating a user score list $U=[-u_1, -u_2, -u_N]$ using a scale of [0, 100]. The user's ratings 66 of the plurality of graphical models 14 may be stored in non-volatile storage 40 or the volatile memory component 38 of the computer 34. To evaluate the effectiveness of the graphical models 14, the correlation coefficient between $R_i$ and U may be defined as $corr(R_i, U)$, that is, the effectiveness of each graphical model i. In some embodiments, the graphical-model-based geobody detection system may take into account the user's ratings 66 and/or the correlation coefficient between $R_i$ and U when applying the graphical models 14. For example, the graphical-model-based geobody detection system may adjust the list 62 of combined geobody scores based on the user's ratings 66 and/or the correlation coefficient between $R_i$ and U.

Figure 12:
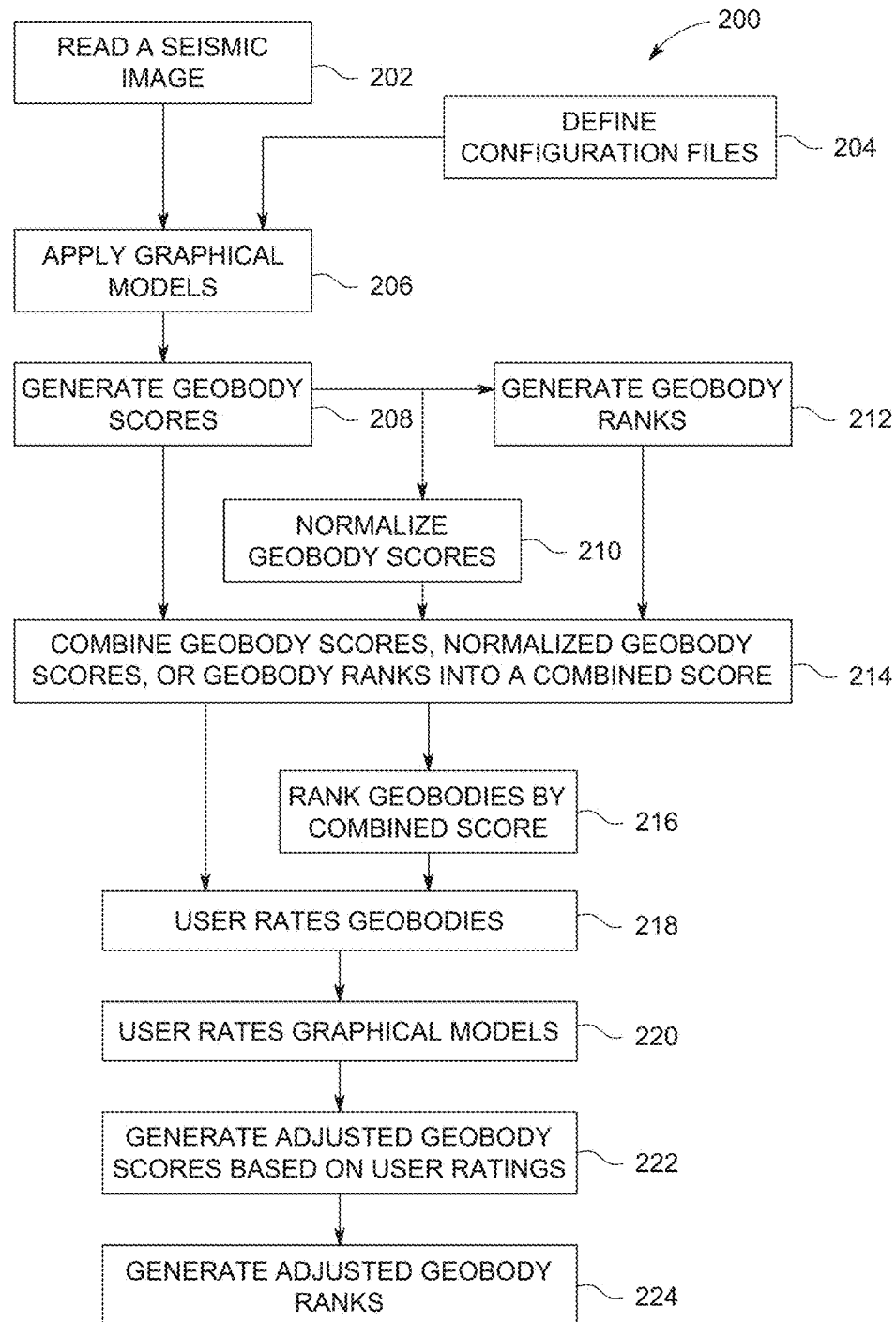
FIG. 12 is a flow chart illustrating an embodiment of a method for graphical-model-based geobody detection, in accordance with aspects of the present disclosure.

FIG. 12 is a flow chart illustrating an embodiment of a method for graphical-model-based geobody detection. First, the inference system 42 reads (block 202) the seismic image 32 that includes a plurality of geobodies. The plurality of configuration files 12 of the plurality of graphical models 14 may also be defined (block 204). The user may define the plurality of graphical models 14 by modifying the corresponding plurality of configuration files 12 that capture the geophysical properties of the desired geobody. Specifically, the user may modify geophysical attributes and rules that are defined in the plurality of configuration files 12. The inference system 42 may then apply (block 206) the graphical models to screen the seismic image 32. As a result, the plurality of lists 16 of geobody scores are generated (block 208). The geobody scores are based on agreement of each geobody's geophysical context information with the graphical model 14. In some embodiments, the scores in the plurality of lists 16 of geobody scores may be normalized (block 210). For example, the normalized scores may be calculated by dividing the original scores by a constant that is equal to the mean of the ten highest original scores. In some embodiments, only a portion of the scores is normalized to avoid noise introduced by low-value scores. Alternatively, the plurality of lists of 16 of geobody scores may be ranked (block 212) by sorting the scores in descending order. The plurality of lists 16 of original geobody scores, normalized scores, or geobody ranks may then be combined into a single list 62 of combined geobody scores (block 214). The combination may be accomplished through the average combining algorithm, the maximum combining algorithm, or the correlation-based combining algorithm. In some embodiments, the list 62 of combined geobody scores may be ranked (block 216), generating the combined ranked 64 list of geobodies. In some embodiments, the user may then rate (block 218) the geobodies based on the list 62 of combined geobody scores, the combined ranked 64 list of geobodies, manual interpretation of comparing the geobodies to the seismic image 32, or any combination thereof. In some embodiments, the user may rate (block 220) each graphical model based on effectiveness. The result may be computed, displayed, saved, or any combination thereof. In some embodiments, the adjusted list of combined geobody scores may be generated (block 222). The adjust list of combined geobody scores may be generated by adjusting the plurality of scores for each geobody based on the user ratings. In some embodiments, the adjusted list of combined geobody scores may be ranked, generating an adjusted combined ranked list of geobodies (block 224).

Technical effects of the invention include systems and methods that identify geobodies from a seismic image by applying a plurality of graphical models. The system and method generate a plurality of scores for each geobody. The plurality of scores may be transformed by normalization or using a ranking of the geobodies based on the score. The resulting plurality of scores or transformed scores are then combined into a single score for each geobody and may be presented to the user. Combining the scores may be achieved through average combining, maximum combining, or correlation-based combining. Geobodies may be ranked by the single combined scores and a combined ranked list of geobodies may be presented to a user. The user may rate the list of scores and/or ranked geobodies, and the user's ratings may be used to adjust the scores for each geobody. The disclosed system and method improved the efficiency and accuracy of locating the most promising geobodies and evaluating the plurality of graphical models.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:
accessing a seismic image comprising a plurality of features of interest;
defining a plurality of configuration files for a plurality of graphical models;
applying the plurality of graphical models to the seismic image;
generating a plurality of scores for each feature of interest, wherein each graphical model generates a score for each feature of interest, and wherein each score is representative of each respective feature's degree of agreement with one of the plurality of graphical models;
combining the plurality of scores for each feature of interest into a plurality of combined scores, wherein each feature of interest has a combined score; and
ranking the plurality of features of interest based on the plurality of combined scores.

2. The method of claim 1, comprising:
generating a plurality of user ratings based on a user rating the plurality of combined scores.

3. The method of claim 1, comprising:
generating a plurality of user ratings based on a user rating the ranked plurality of features of interest.

4. The method of claim 1, comprising:
generating an adjusted plurality of scores for the plurality of features of interest, wherein the plurality of scores for each feature of interest is adjusted based at least on the plurality of user ratings.

5. The method of claim 3, comprising:
generating an adjusted plurality of scores for the plurality of features of interest, wherein the plurality of scores for each feature of interest are adjusted based on the plurality of user ratings.

6. The method of claim 4, comprising:
generating an adjusted ranked plurality of features of interest based on the adjusted plurality of scores.

7. The method of claim 5, comprising:
generating an adjusted ranked plurality of features of interest based on the adjusted plurality of scores.

8. A system, comprising:
a processor, configured to:
access a seismic image comprising a plurality of features of interest;
define a plurality of configuration files for a plurality of graphical models;
apply the plurality of graphical models to the seismic image;
generate a plurality of scores for each of the plurality of features of interest, wherein each graphical model generates a score for each feature of interest, and wherein each score is representative of each respective feature's degree of agreement with one of the plurality of graphical models;

combine the plurality of scores into a plurality of combined scores for the plurality of features of interest; and rank the plurality of features of interest based on the plurality of combined scores.

9. The system of claim 8, wherein the at least one feature of interest is a carbonate mound.

10. The method of claim 9, wherein the at least one feature of interest is a direct hydrocarbon indicator.

11. The system of claim 8, wherein the processor is configured to combine the plurality of scores into a plurality of combined scores for the plurality of features of interest by:

normalizing the plurality of scores to generate a plurality of normalized scores; and combine the plurality of normalized scores.

12. The system of claim 8, wherein the processor is configured to combine the plurality of scores into a plurality of combined scores for the plurality of features of interest by using correlation-based combining.

13. A method comprising:

accessing a seismic image comprising a plurality of features of interest;

defining a plurality of configuration files for a plurality of graphical models;

applying the plurality of graphical models to the seismic image, comprising acts of:

generating a plurality of scores for each feature of interest, wherein each graphical model generates a score for each feature of interest, and wherein each score is representative of each respective feature's degree of agreement with one of the plurality of graphical models; and generating a plurality of rankings of the plurality of features of interest for each graphical model based on the plurality of scores; and combining the plurality of rankings into a respective combined ranking for each feature of interest.

14. The method of claim 13, wherein defining a plurality of configuration files comprises:

defining geophysical attributes; and defining relationships between the geophysical attributes.

15. The method of claim 13, wherein combining the plurality of rankings comprises using average combining.

16. The method of claim 13, wherein combining the plurality of rankings comprises using maximum combining.

17. The method of claim 13, wherein combining the plurality of rankings comprises using correlation-based combining.

18. The method of claim 17, wherein combining the plurality of rankings using correlation-based combining comprises removing at least some correlations between the graphical models in the plurality of graphical models.

* * * * *